(12) United States Patent
Schwartz

(10) Patent No.: US 9,888,676 B2
(45) Date of Patent: Feb. 13, 2018

(54) FISHING LURE AND ATTRACTORS AND METHODS OF MANUFACTURE

(71) Applicant: Jason K. Schwartz, Deerfield, IL (US)

(72) Inventor: Jason K. Schwartz, Deerfield, IL (US)

(*) Notice: Subject to any disclaimer, the term of this patent is extended or adjusted under 35 U.S.C. 154(b) by 0 days.

(21) Appl. No.: 14/567,449

(22) Filed: Dec. 11, 2014

(65) Prior Publication Data

US 2015/0164055 A1    Jun. 18, 2015

Related U.S. Application Data

(63) Continuation of application No. 14/134,987, filed on Dec. 19, 2013, now abandoned, and a continuation of application No. 13/889,893, filed on May 8, 2013, now abandoned, and a continuation of application No. 13/011,540, filed on Jan. 21, 2011, now abandoned.

(51) Int. Cl.
| | |
|---|---|
| *A01K 85/10* | (2006.01) |
| *A01K 85/00* | (2006.01) |
| *A01K 85/01* | (2006.01) |
| *A01K 91/06* | (2006.01) |
| *A01K 85/16* | (2006.01) |

(52) U.S. Cl.
CPC .............. *A01K 85/00* (2013.01); *A01K 85/01* (2013.01); *A01K 85/10* (2013.01); *A01K 85/16* (2013.01); *A01K 91/06* (2013.01)

(58) Field of Classification Search
CPC ......... A01K 85/10; A01K 85/00; A01K 85/14
USPC ........... 43/42.09, 42.11, 42.13, 42.32, 42.33, 43/42.34
See application file for complete search history.

(56) References Cited

U.S. PATENT DOCUMENTS

| | | | | | |
|---|---|---|---|---|---|
| 713,435 | A | * | 11/1902 | Hildebrandt ........... | A01K 85/10 43/42.19 |
| 1,314,868 | A | * | 9/1919 | Gray ...................... | A01K 85/16 43/42.19 |
| 1,596,103 | A | * | 8/1926 | James ..................... | A01K 85/14 43/42.34 |
| 1,627,637 | A | * | 5/1927 | Dahlquist .............. | A01K 85/10 43/42.34 |
| 1,692,222 | A | * | 11/1928 | Pagin ..................... | A01K 85/16 43/42.34 |
| 1,698,193 | A | * | 1/1929 | Geer ....................... | A01K 85/10 43/42.19 |

(Continued)

FOREIGN PATENT DOCUMENTS

| | | | | | |
|---|---|---|---|---|---|
| CH | 152796 | A | * | 2/1932 | ............. A01K 85/14 |
| FR | 720641 | A | * | 2/1932 | ............. A01K 85/10 |

(Continued)

*Primary Examiner* — Darren W Ark
(74) *Attorney, Agent, or Firm* — Patzik, Frank & Samotny Ltd.

(57) ABSTRACT

A blade body component of a fishing lure formed from a material that includes a first side and a second side, wherein a surface relief grating image effect component is positioned on at least one side of the blade body component. In certain embodiments, the blade body component includes a curvature produced by a curving device. The blade body may be part of a quick change blade system that allows the user to quickly and easily remove and replace one or more of the blade body component on a fishing lure by using a combination of a quick change clevis and a clasp.

13 Claims, 7 Drawing Sheets

(56) References Cited

U.S. PATENT DOCUMENTS

| | | | | |
|---|---|---|---|---|
| 1,750,604 A * | 3/1930 | Pflueger | A01K 85/10 | 43/42.32 |
| 1,787,733 A * | 1/1931 | Pagin | A01K 85/16 | 43/42.34 |
| 1,862,893 A * | 6/1932 | Holtzclaw | A01K 85/10 | 43/42.34 |
| 2,192,563 A * | 3/1940 | Starkey | A01K 85/10 | 43/42.34 |
| 2,241,941 A * | 5/1941 | Bates | A01K 85/16 | 43/42.33 |
| 2,486,635 A * | 11/1949 | Coats | A01K 85/10 | 43/42.19 |
| 2,503,607 A * | 4/1950 | Arff | A01K 85/14 | 43/42.34 |
| D161,716 S * | 1/1951 | Starkey | | 43/42.34 |
| 2,572,721 A * | 10/1951 | Hatt | A01K 85/10 | 43/42.19 |
| 2,586,679 A * | 2/1952 | Martin | A01K 85/10 | 43/42.19 |
| 2,603,023 A * | 7/1952 | Parish | A01K 85/10 | 43/42.19 |
| 2,618,830 A * | 11/1952 | Luther | A01K 85/10 | 24/908 |
| 2,657,495 A * | 11/1953 | John | A01K 85/14 | 43/42.33 |
| 2,833,079 A * | 5/1958 | Robert | A01K 85/14 | 43/42.34 |
| 3,095,664 A * | 7/1963 | Nichols | A01K 85/10 | 43/42.19 |
| 3,112,576 A * | 12/1963 | John | A01K 85/01 | 43/42.14 |
| 3,488,877 A * | 1/1970 | Carabasse | A01K 85/10 | 43/42.13 |
| 3,568,351 A * | 3/1971 | Perrin | A01K 91/065 | 43/42.18 |
| 3,604,140 A * | 9/1971 | Nelson | A01K 85/10 | 43/42.13 |
| 3,656,253 A * | 4/1972 | Gaunt | A01K 91/065 | 43/42.33 |
| 3,750,325 A * | 8/1973 | Feltman | A01K 85/00 | 43/42.19 |
| 3,943,651 A * | 3/1976 | Erving | A01K 85/10 | 43/42.13 |
| 3,974,587 A * | 8/1976 | Levake | A01K 85/10 | 43/42.19 |
| 4,199,888 A * | 4/1980 | Barnes | A01K 95/00 | 43/42.33 |
| 4,209,932 A * | 7/1980 | Pate | A01K 85/00 | 43/42.13 |
| 4,501,087 A * | 2/1985 | Blomquist | A01K 85/14 | 43/42.2 |
| 4,617,753 A * | 10/1986 | Pauley | A01K 85/10 | 43/42.19 |
| 4,631,854 A * | 12/1986 | Rosko | A01K 85/00 | 43/42.33 |
| 4,831,765 A * | 5/1989 | Bradshaw | A01K 85/14 | 43/42.32 |
| 4,860,486 A * | 8/1989 | Vanderplow | A01K 85/10 | 43/42.19 |
| 4,864,765 A * | 9/1989 | Vanderplow | A01K 85/10 | 43/42.19 |
| 4,885,866 A * | 12/1989 | Vanderplow | A01K 85/10 | 43/42.19 |
| 5,084,996 A * | 2/1992 | Woodruff | A01K 85/14 | 43/42.33 |
| 5,600,917 A * | 2/1997 | Manno | A01K 83/00 | 43/44.82 |
| 5,605,004 A * | 2/1997 | Boullt | A01K 85/00 | 43/42.13 |
| 5,647,163 A * | 7/1997 | Gorney | A01K 85/00 | 43/42.13 |
| 6,029,390 A * | 2/2000 | Kaminsky | A01K 85/00 | 43/42.32 |
| H001865 H * | 10/2000 | Aoki | A01K 85/10 | 43/42.13 |
| 6,173,521 B1 * | 1/2001 | Rockhill, Jr. | A01K 85/00 | 43/42.13 |
| D472,294 S * | 3/2003 | Snyder | D22/129 | |
| 7,367,759 B2 * | 5/2008 | Kozlowski | B23C 3/00 | 264/138 |
| 7,491,021 B2 * | 2/2009 | Kozlowski | B23C 3/00 | 29/557 |
| 7,906,191 B2 * | 3/2011 | Pratt | A63C 5/12 | 43/18.5 |
| 8,020,339 B1 * | 9/2011 | Carter | A01K 85/00 | 43/44.83 |
| 8,713,848 B2 * | 5/2014 | Huppert | A01K 91/053 | 43/42.13 |
| 2002/0148155 A1 * | 10/2002 | Pasley | A01K 85/14 | 43/42.49 |
| 2006/0064917 A1 * | 3/2006 | Cakebread | A01K 91/10 | 43/15 |
| 2009/0145017 A1 * | 6/2009 | Richey | A01K 85/08 | 43/43.14 |
| 2011/0308135 A1 * | 12/2011 | Uhrig | A01K 85/18 | 43/42.19 |
| 2012/0073182 A1 * | 3/2012 | Poss | A01K 85/16 | 43/42.13 |
| 2015/0096220 A1 * | 4/2015 | Buhler | A01K 91/053 | 43/42.11 |

FOREIGN PATENT DOCUMENTS

| | | | | |
|---|---|---|---|---|
| FR | 852612 A * | 2/1940 | | A01K 85/10 |
| FR | 2059808 A5 * | 6/1971 | | A01K 85/10 |
| FR | 2427786 A1 * | 1/1980 | | A01K 85/10 |
| GB | 1379882 A1 * | 1/1975 | | A01K 85/10 |

* cited by examiner

FISHING LURE AND ATTRACTORS AND METHODS OF MANUFACTURE

PRIORITY STATEMENT

This application claims the benefit of U.S. Provisional Application 61/322,395 filed Apr. 9, 2010.

FIELD OF INVENTION

The present invention relates generally to fishing lures and attractors, and more particularly to fishing lures that include a blade body component with at least one surface that aids in attracting fish to the lure and methods of manufacturing same.

The present invention also contemplates a quick change blade system that allows the user to quickly and easily remove and replace one or more of the blade body component on a fishing lure or spinnerbait. By using a combination of a quick change clevis and a clasp, the user can change one or both of the blades of the lure without the need for re-tying knots or removing and replacing the entire lure.

BACKGROUND OF THE INVENTION

Fishing lures and attractors are used to attract fish such as through movement, vibration, and color. Most fishing lures incorporate a hook—or plurality of hooks—so that a fish bites the hook. The hook catches the fish when the fish attacks the fishing lure.

There are many types of fishing lures and attractors. They are all manufactured in different ways to resemble prey for the fish in most cases, but are sometimes engineered to appeal to the sense of territory, curiosity or anger of the fish. Most lures are made to look like dying, injured, or fast moving prey and include the following types: jig, surface lure, blade lure, plug, artificial fly, soft baits make of plastic or rubber designed to resemble worms, leeches or other creatures, spinnerbait, and swim bait.

When fishing, there may be a need to change blades on a fishing lure. Depending on changing weather and water conditions (usually changing weather will have an effect on the water conditions), there is a need to change from one type of blade to another. One blade may be a better attractor in cloudy water, while another blade may be a better attractor in clear water. For example, if a cloudy day begins to clear up and as clouds disperse, the sun may allow for improved viewing under water.

Accordingly, a different blade may be a better choice for fishing at that time. The user would have to replace the fishing lure currently being used with another having different blades. This will take time and the user may end up with a lure that has the best blades for that situation, but not the best head or body. Currently, the user would have to replace the entire fishing lure in order to obtain the optimal fishing lure for the changing conditions.

As such, there is a need for improved fishing lures and attractors in design and manufacture to improve the attraction of fish to the lure and ultimately to the hook or plurality of hooks. There is also a need for a simplified system of components to allow the user to quickly and easily replace one or more of the blades without replacing the entire fishing lure. The present invention satisfies this demand.

SUMMARY OF THE INVENTION

The present invention is discussed herein with reference to any type of lure or attractors that includes a blade body component. Lure types that include a blade body component include for example, spinnerbaits, buzzbaits, in-line spinners, French spinners, vibrating lures, casting spoons, jigs, trolling spoons, flutter spoons, weedless spoons and ice blades.

According to the present invention, the blade body component is formed from an aluminum material that includes a first side and a second side. The material may be any type such as metal, non-metal, or alloy. A surface relief grating image effect component is positioned on at least one side of the blade body component. The surface relief grating image effect component is that as described in U.S. Pat. Nos. 7,491,021 and 7,367,759 both to Kozlowski, incorporated herein by reference.

The blade body component is formed into any shape and size. For example, any shape includes those known as Colorado, Indiana, Willow, Chopper, French, Dakota, In-Line, Doc Shelton, Muskie, Delta, Propeller, Quad Propeller, Chopper Propeller, Clacker, Jig Dancer, Plug Bill lip, Jitterbug Bib, Flap Tail, Creeper Wings, Tally Wacker Tail, Dodgers and Flashers, to name a few. Size of the blade component includes, for example, any length and width.

It is also contemplated the blade body component may be of any color, finish, or weight. For example, the blade body component may be the color gold, silver, copper, red, blue, green or any combination thereof. The finish may be hammered, smooth or rippled, to name a few.

In another embodiment, the blade body component includes a curvature, or non-flat or non-straight appearance. The curvature is produced by a die or curving device. By using progressive stamping and an automatic feeder, the blade body can be punched, bent and otherwise modified, resulting in the blade described herein.

The fishing lure is made up of a number of components that work together to attract and catch a fish. As an example, a spinnerbait is made up of one or more blades as discussed herein for attracting the fish to the lure, one or more swivels and/or hollow metal beads to allow the blades to maintain space from one another and to move freely in a number of directions, a number of clevises and/or clasps that allow for the attachment of the blades to the lure, and a head and/or body including a skirt which acts as bait for a particular type of fish.

By incorporating a clasp, such as a lobster clasp, into the fishing lure, along with a quick change clevis, made from wire, coiled and formed such that one or more of the blade bodies can be removed from the lure and replaced with other blade bodies without necessarily changing the entire blade. The quick change clevis is made by wrapping a piece of wire into a coil shape with an extension that bends up and makes contact with the outer portion of the coil. The configuration creates a loop in which the extension can be pulled or forced from the coil to attach the blade. Once attached, the extension returns to its original position against the coil, thereby holding the blade in place.

As such, when weather or water condition (or both) change, the user can quickly and easily replace one or more blades without untying or replacing the lure being used. The blade replacement takes a few seconds and the user is ready to begin fishing again with a different set of blades.

The present invention and its attributes and advantages will be further understood and appreciated with reference to the detailed description below of presently contemplated embodiments, taken in conjunction with the accompanying drawings.

BRIEF DESCRIPTION OF THE DRAWINGS

The invention can be better understood by reading the following detailed description of certain preferred embodiments, reference being made to the accompanying drawings in which.

DETAILED DESCRIPTION OF EMBODIMENTS OF THE INVENTION

Figure 1:
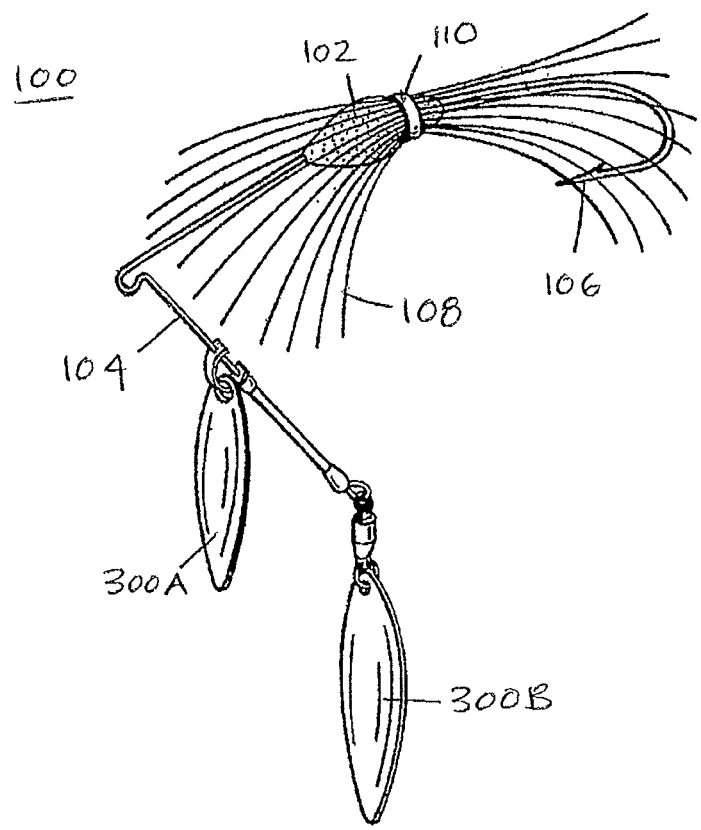
FIG. 1 illustrates one embodiment of a fishing lure including two blade body components according the to present invention.

As mentioned above, there are many types of lures and attractors that include a blade body component. FIG. 1 illustrates one embodiment of a spinner-bait fishing lure that includes two blade body components. More specifically, as shown in FIG. 1, the spinnerbait fishing lure 100 includes a base element 102 that interconnects to a wire 104 on one end and a hook 106 on the other end. A plurality of streamers (silicone or rubber skirt) 108 surround the base element 102 and are secured by a band (or collar) 110. As shown in FIG. 1, two blade body components 300A, 300B are assembled to the wire 104.

Figure 2:
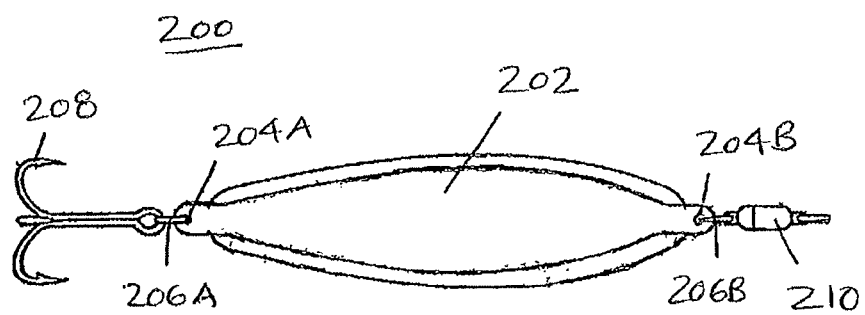
FIG. 2 illustrates another embodiment of a fishing lure including a blade body component according the to present invention.

FIG. 2 illustrates another embodiment of a blade lure, specifically a minnow spoon fishing lure. More specifically, as shown in FIG. 2, the minnow spoon fishing lure 200 includes a blade body component 202 that includes two connection holes 204A, 204B. Rings 206A, 206B engage with connection holes 204A, 204B respectively. A hook 208 assembles to ring 206A and a leader 210 assembles to ring 206B.

Figure 3:
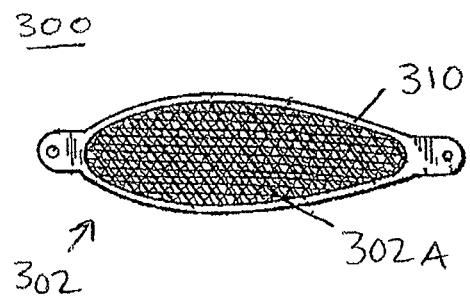
FIG. 3 illustrates a top view of a blade body component according to one embodiment of the present invention.
Figure 4:
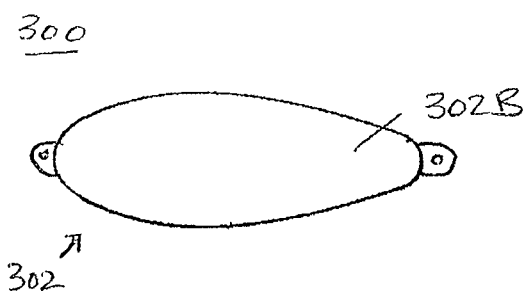
FIG. 4 illustrates a bottom view of the blade body component according to the embodiment of FIG. 3 of the present invention.
Figure 5:
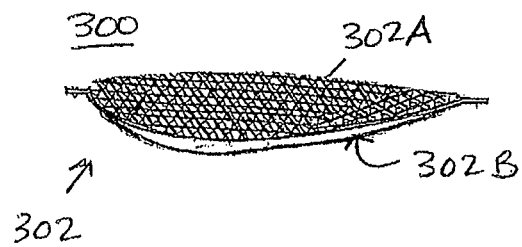
FIG. 5 illustrates a side view of the blade body component according to the embodiment of FIG. 3 of the present invention.
Figure 7A:
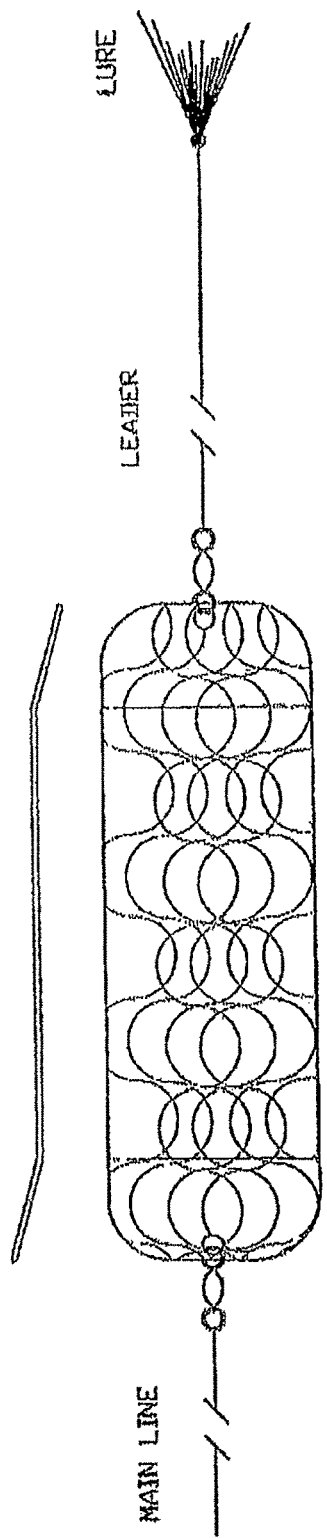
FIGS. 7A and 7B illustrate different attractors according to the present invention.
Figure 7B:
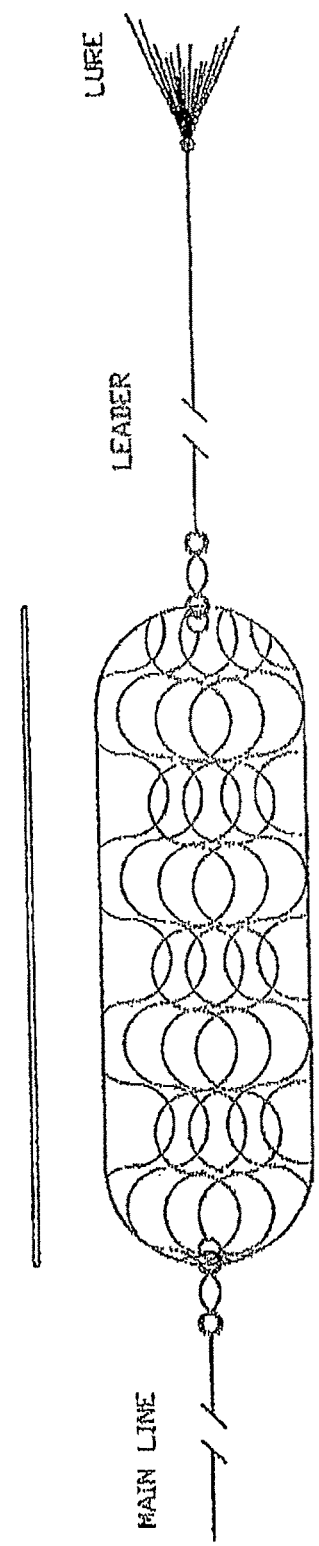

FIGS. 3 through 5 illustrate a blade body component according to one embodiment of the present invention. The present invention is discussed herein with reference to a spinnerbait, but any type of lure that includes a blade body component is contemplated, for example, buzzbaits, in-line spinners, French spinners, vibrating lures, casting spoons, jigs, trolling spoons, flutter spoons, weedless spoons and ice blades. More specifically, the present invention is discussed herein with reference to the shape of a double willow blade spinnerbait for exemplary purposes only. Any shape blade body component is contemplated, for example, Colorado, Willow, Indiana, Chopper, French, Dakota, In-Line, Doc Shelton, Muskie, Delta, Propeller, Quad Propeller, Chopper Propeller, Clacker, Jig Dancer, Plug Bill lip, Jitterbug Bib, Flap Tail, Creeper Wings, Tally Wacker Tail; and attractors (see FIGS. 7A and 7B) such as Dodgers, Flashers, and Divers, among others.

As shown in FIGS. 3 through 5, a blade body component 300 is formed from material 302 that includes a first side 302A and a second side 302B. The material 302 may be any type such as metal, non-metal, or alloy. A surface relief grating image effect component 310 is positioned on the first side 302A of the material 302, although it is contemplated that the surface relief grating image effect component 310 can be placed on the second side 302B, or both sides 302A, 302B of the material 302. The surface relief grating image effect component 310 is that as described in U.S. Pat. Nos. 7,491,021 and 7,367,759 both to Kozlowski, incorporated herein by reference.

The material 302 is formed into the blade body component 300 of any size and shape, such as by stamping, embossing, pressing, punching, and cutting, for example, water jet cutting, laser cutting and steel rule die, or die cutting. In the preferred embodiment, a progressive stamping procedure is used to form the blade 300. After the material 302 is formed into the blade body component 300, in certain embodiments the blade body component 300 includes a curvature, which may vary depending on the intended vibration of the device or water displacement, such as that shown in FIG. 5.

Figure 6:
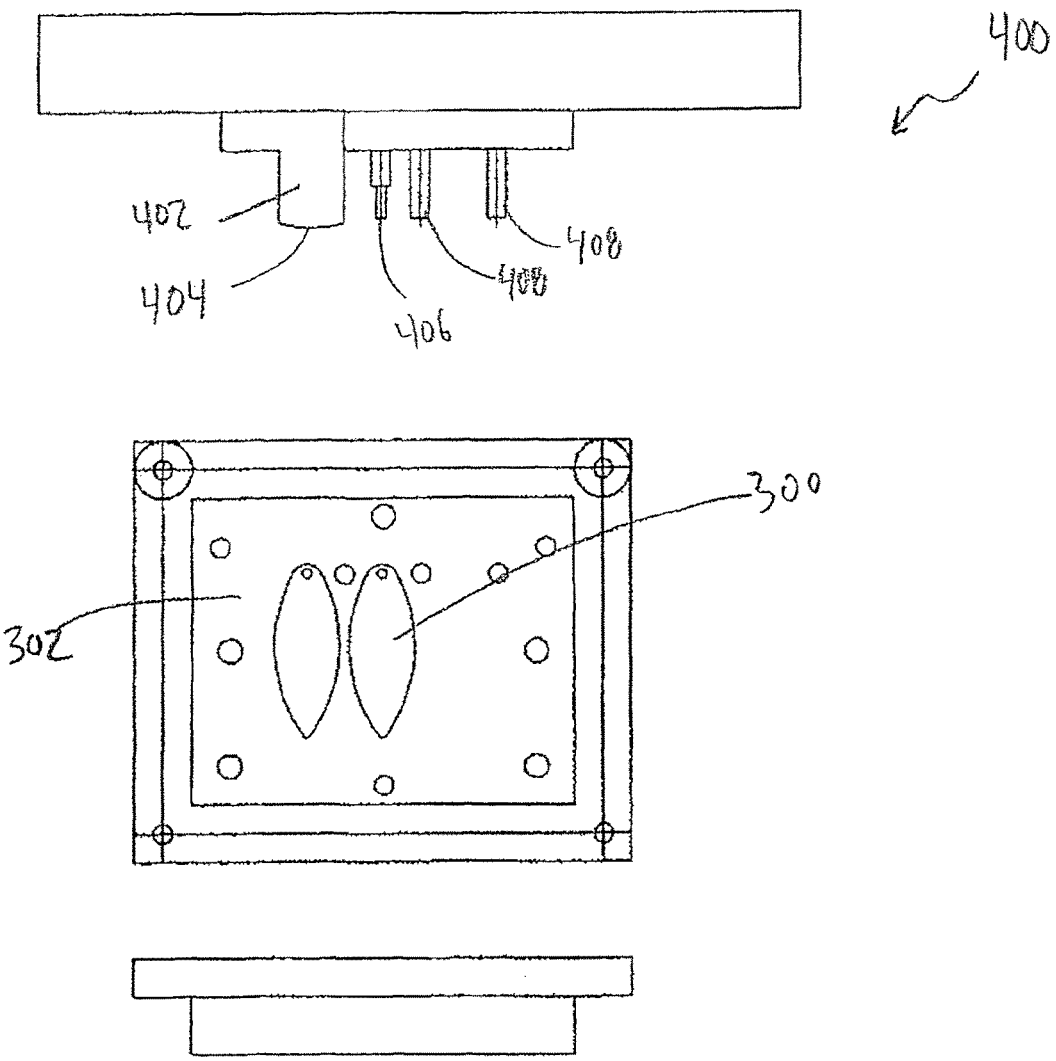
FIG. 6 illustrates a perspective view of a progressive stamping system to produce a curvature of the blade body component and holes according to one embodiment of the present invention.

The curvature within the blade body component and holes according to one embodiment of the present invention is produced by a progressive stamping system 400 as illustrated in FIG. 6 and as known by those having ordinary skill in the art. The progressive stamping system 400 contains a curving device 402 having a bottom component 404, with a convex shape. The stamping system 400 also contains a hole punch 406 and various guide posts 408. The material 302 is automatically or manually fed into the progressive stamping system 400 and is positioned using the guide posts 408. The progressive stamping system 400 is then closed and the bottom component 404 of the curving device 402 makes contact with the material 302 and creates the curved surface. At the same time, the hole punch 406 places a hole in the material 302 and the force of the stamping process cuts the newly formed blade from the material 302. The system 400 is then opened and the material 302 is fed again into place for the next stamping. FIG. 6 shows an example of a progressive stamping system 400 for a #5 Willow Blade.

There are several ways that these blades and attractors can be finished to achieve different colors and luster (reflectivity), such as powder-coating (powder paints), use of automotive paints, acrylic paints, epoxy paints, vinyl paints, water based paints, lacquer paints, anodizing and plating. Other methods of finishing the blades and attractors can be used in accordance with the present invention as understood by those having ordinary skill in the art of finishing metal material.

Figure 8B:
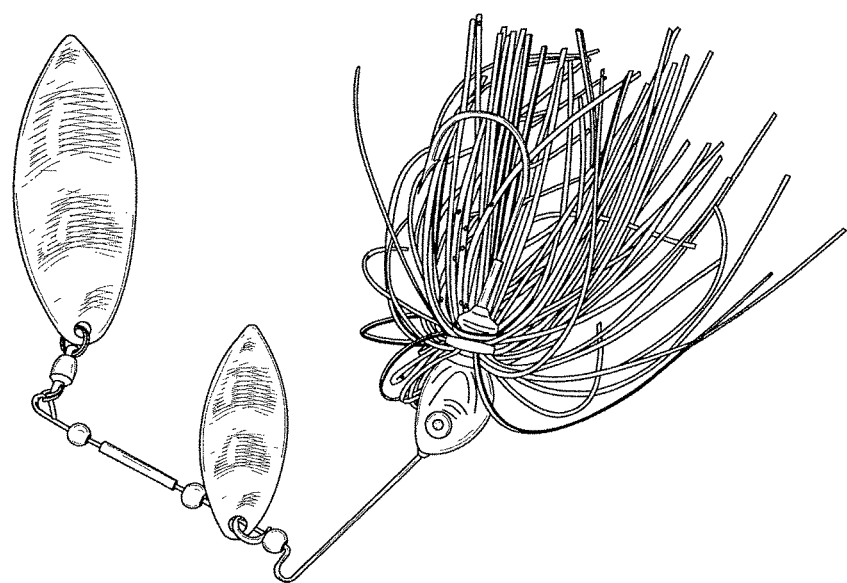
FIGS. 8A and 8B are drawings of the different types and colors of blades and a lure according to the present invention.
Figure 8A:
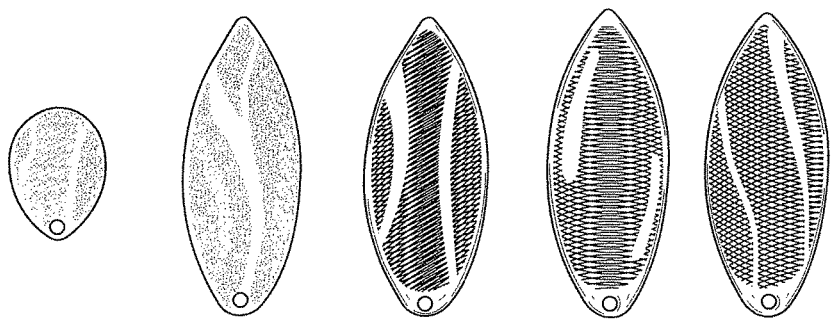

FIG. 8A is a drawing of various sized and colored blades in accordance with the preferred embodiment. The blades have been formed as described herein and powder-coated to create the various colors. FIG. 8B is a drawing of a lure that has been assembled using two blades in accordance with the present invention.

Figure 9:
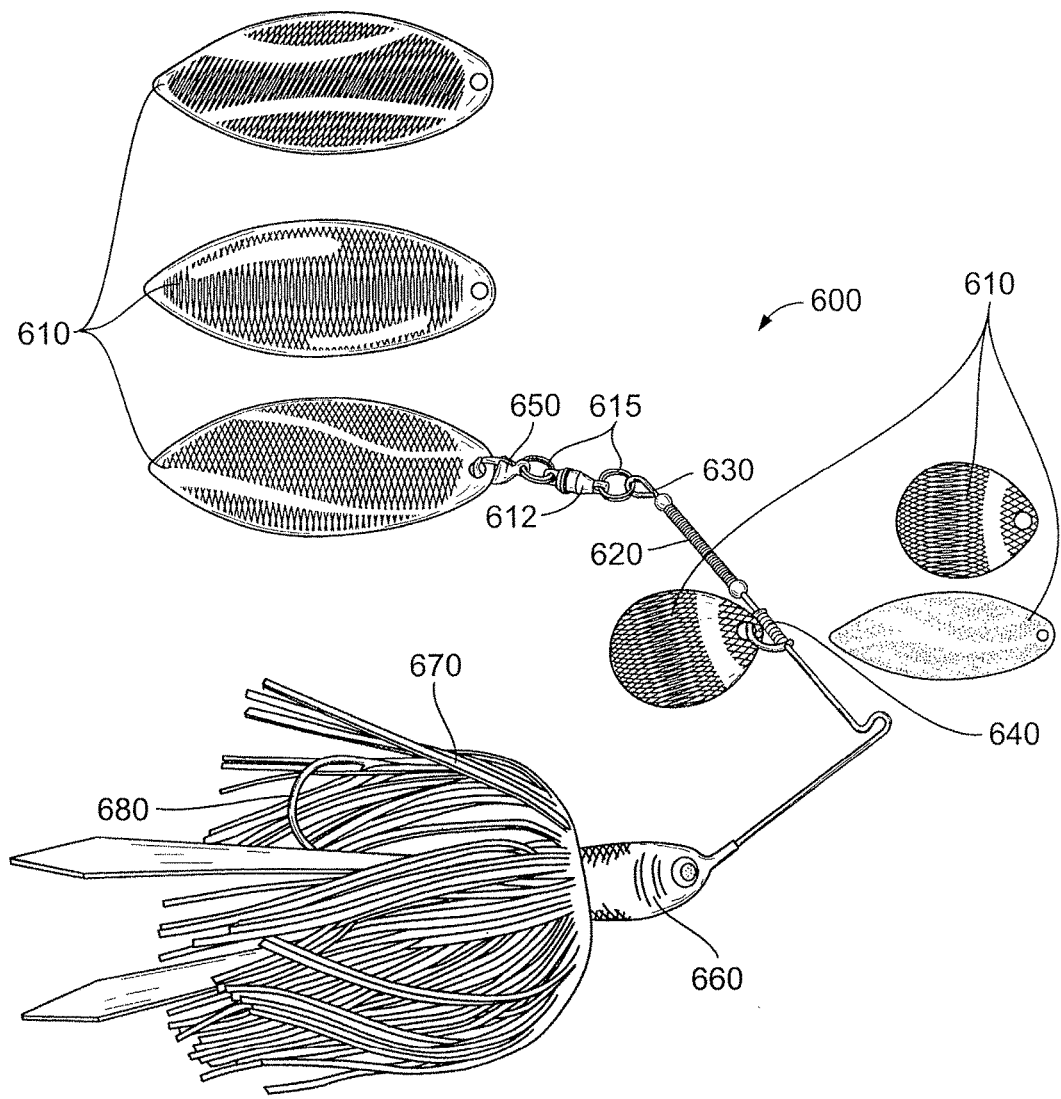
FIG. 9 illustrates a fishing lure incorporating the clasp and clevis devices in accordance with an embodiment of the present invention.

FIG. 9 shows a fishing lure 600 made up of a number of components that work together to attract and catch a fish (not shown). The fishing lure 600, such as a spinnerbait and the other types of lures described herein, can be configured with one or more blades 610 for attracting the fish to the lure 600, a swivel 612 with split rings 615 to attach blade to wire-form, a spring spacer 620 sandwiched between two hollow metal beads 630 to allow the blades 610 to maintain space from one another and to move freely in a number of directions, a number of clevises 640 and/or clasps 650 that allow for the attachment of the blades 610 to the lure 600, and a head and/or body 660 including a tail 670 which hides a hook 680 and acts as bait for a particular type of fish.

Figure 10:
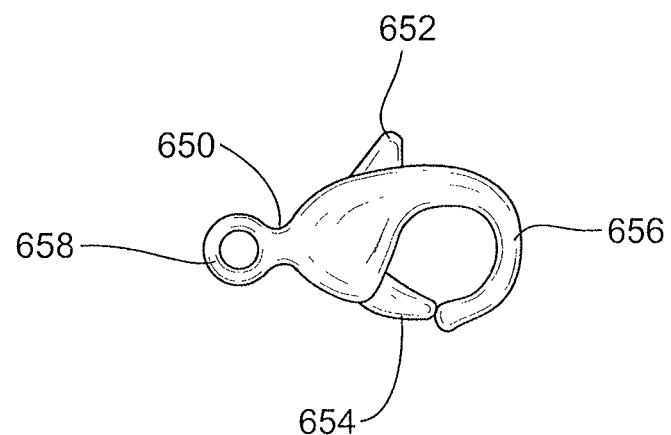
FIG. 10 illustrates a clasp device for attaching a blade body component to the fishing lure in accordance with an embodiment of the present invention.

FIG. 10 shows a clasp 650, such as a lobster clasp or lobster hook, that is incorporated into the fishing lure 600. The clasp 650, usually used for necklaces, bracelets and key chains, is a type of fastener held closed by a spring (not shown) which can be opened by holding down a small lever 652. Once the lever 652 is held down, the claw mechanism 654 moves in a direction usually towards the lever 652 and thereby opens the catch 656. A ring-like structure 658 at one end allows the clasp 650 to be attached to another item, such as the fishing lure 600. In the present invention, the clasp 650 is attached to the fishing lure 600 using the ring-like structure 658.

Once attached to the lure 600 (as shown in FIG. 9), a blade 610 can be easily attached to the catch 656 by pressing down on the lever 652 until the claw mechanism 654 moves and then sliding the blade 610 onto the catch 656. Once on the catch 656, the lever 652 is released and the blade 610 is held on the clasp 650 by the catch 656 and the claw 654. Now the blade can be easily and quickly removed from the lure 600 and replaced with a different blade 610 as water clarity or weather conditions change.

Figure 11:
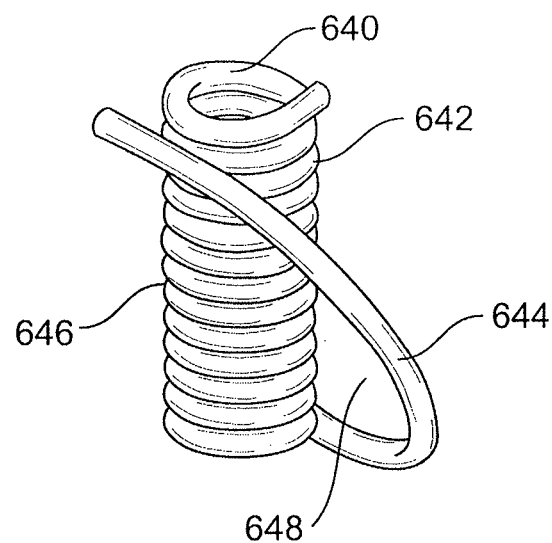
FIG. 11 illustrates a clevis device for attaching a blade body component to the fishing lure in accordance with an embodiment of the present invention.

FIG. 11 shows a quick change clevis 640, made from a coiled wire 642, and an extension or retaining arm 644. The clevis 640 is placed on the blade arm of wire form (shown in FIG. 9) and is spaced from the clasp 650 and other components by a spring spacer 620, hollow metal beads 630, or both.

The quick change clevis 640 is made by wrapping a piece of wire, for example, 0.021 inch, stainless steel wire, into a coil shape 642 with an extension or retaining arm 644, preferably made from the same wire in a single piece, that curves up and makes contact with the outer portion of the coil 646, preferably with no gap between the outer coil 646 and the retaining arm 644. The configuration creates a loop 648 in which the retaining arm 644 can be pulled or forced from the coil 642 to attach the blade 610. Once attached, the retaining arm 644 returns to its original position against the outer portion of the coil 646, thereby holding the blade 610 in place.

In the preferred embodiment, the clevis 640 is configured to be about 0.29 inches high, with the loop 648 created by the retaining arm 644 about 0.16 inches out from the center of the coil 642, such that a blade 610 can be easily placed on the retaining arm 644 and then captured when the retaining arm 644 returns to its original position against the outer portion of the coil 646.

The clevis 640 is configured such that a blade body 610 can be removed from the clevis 640 and thus the lure 600 and replaced with another blade body 610 without changing the entire lure 600.

For example, if weather or water conditions change, the user can pull on the retaining arm 644 of the clevis 640 and quickly and easily, and replace the blade 610 with another blade 610. There is no need to replace the entire lure 600. The blade replacement takes a few seconds and the user is ready to begin fishing again with a different set of blades.

While the disclosure is susceptible to various modifications and alternative forms, specific exemplary embodiments thereof have been shown by way of example in the drawings and have herein been described in detail. It should be understood, however, that there is no intent to limit the disclosure to the particular embodiments disclosed, but on the contrary, the intention is to cover all modifications, equivalents, and alternatives falling within the scope of the disclosure as defined by the appended claims.

The invention claimed is:

1. A machined fishing lure apparatus comprising a clasp and a blade body, said blade body having a first side and a second side, said blade body having a top end and a bottom end, said blade body comprising at least one hole located near the top end of said blade body, said blade body configured with a curvature, such that said blade body will vibrate as it is pulled through water, said first side of said blade body comprising a surface relief grating image, said surface relief grating image manufactured through machining, such that said surface relief grating image comprises at least one array of substantially circular, intersecting grooves, said at least one array of substantially circular, intersecting grooves being arranged serially and extending centered along a line, wherein at least two arc lengths of said at least one array of substantially circular, intersecting grooves are parallel and are separated by substantially an equal distance, wherein said at least one array of substantially circular, intersecting grooves are cut and finished simultaneously using a rotating cutting tool, such that said surface relief grating image causes a three dimensional or holographic reflection to appear when the blade body is exposed to a light source, and whereby said blade body is attached to said fishing lure apparatus via said clasp at said at least one hole located near the top end of said blade body, such that said blade body can be quickly and easily attached to and removed from the fishing lure apparatus by using said clasp.

2. The machined fishing lure apparatus in claim 1, wherein said second side of said blade body comprises a second surface relief grating image, said second surface relief grating image manufactured through machining, such that said second surface relief grating image comprises at least one second array of substantially circular, intersecting grooves, said at least one second array of substantially circular, intersecting grooves being arranged serially and extending centered along a line, wherein at least two arc lengths of said at least one second array of substantially circular, intersecting grooves are parallel and are separated by substantially an equal distance, wherein said at least one second array of substantially circular, intersecting grooves are cut and finished simultaneously using a rotating cutting tool, such that said second surface relief grating image causes a three dimensional or holographic reflection to appear when the blade body is exposed to a light source.

3. The machined fishing lure apparatus in claim 2, wherein said second side of said blade body is further finished by painting, powder-coating or plating.

4. The machined fishing lure apparatus in claim 1, wherein said first side of said blade body is further finished by painting, powder-coating or plating.

5. The machined fishing lure apparatus in claim 1, wherein said clasp comprises a lobster clasp.

6. The machined fishing lure apparatus in claim 5, wherein said lobster clasp comprises a small lever and claw mechanism, such that when the small lever is held down, said claw mechanism opens up and said blade body can be attached to or removed from said fishing lure apparatus.

7. The machined fishing lure apparatus in claim 1, wherein said clasp comprises a coiled wire and a retaining arm, such that said retaining arm creates a loop with the coiled wire, and said blade body can be placed onto or removed from said fishing lure apparatus by inserting or removing said blade body on or from said loop.

8. A machined fishing lure apparatus comprising a clevis, wherein said clevis comprises a coiled wire and a retaining arm, such that said retaining arm creates a loop with the coiled wire, and a blade body, said blade body having a first side and a second side, said blade body having a top end and a bottom end, said blade body comprising at least one hole located near the top end of said blade body, said blade body configured with a curvature, such that said blade body will vibrate as it is pulled through water, said first side of said blade body comprising a surface relief grating image, said surface relief grating image manufactured through machining, such that said surface relief grating image comprises at least one array of substantially circular, intersecting grooves, said at least one array of substantially circular, intersecting grooves being arranged serially and extending centered along a line, wherein at least two arc lengths of said at least one array of substantially circular, intersecting grooves are parallel and are separated by substantially an equal distance, wherein said at least one array of substantially circular, intersecting grooves are cut and finished simultaneously using a rotating cutting tool, such that said surface relief grating image causes a three dimensional or holographic reflection to appear when the blade body is exposed to a light source, and whereby said blade body is attached to said fishing lure apparatus via said clevis at said at least one hole located near the top end of said blade body, such that said blade body can be quickly and easily attached to and removed from the coiled wire using said retaining arm.

9. The machined fishing lure apparatus in claim 8, wherein said second side of said blade body comprises a second surface relief grating image, said second surface relief grating image manufactured through machining, such that said second surface relief grating image comprises at least one second array of substantially circular, intersecting grooves, said at least one second array of substantially circular, intersecting grooves being arranged serially and extending centered along a line, wherein at least two arc lengths of said at least one second array of substantially circular, intersecting grooves are parallel and are separated by substantially an equal distance, wherein said at least one second array of substantially circular, intersecting grooves are cut and finished simultaneously using a rotating cutting tool, such that said second surface relief grating image causes a three dimensional or holographic reflection to appear when the blade body is exposed to a light source.

10. The machined fishing lure apparatus in claim 9, wherein said second side of said blade body is further finished by painting, powder-coating or plating.

11. The machined fishing lure apparatus in claim 8, wherein said first side of said blade body is further finished by painting, powder-coating or plating.

12. The machined fishing lure apparatus in claim 8, further comprising a lobster clasp.

13. The machined fishing lure apparatus in claim 12, wherein said lobster clasp comprises a small lever and claw mechanism, such that when the small lever is held down, said claw mechanism opens up and said blade body can be attached to or removed from said fishing lure apparatus.

\* \* \* \* \*